Patented Apr. 10, 1928.

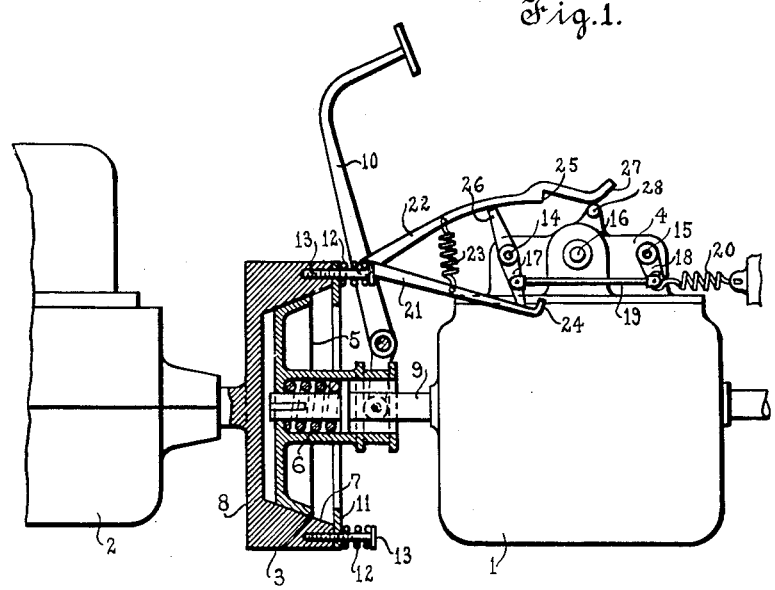
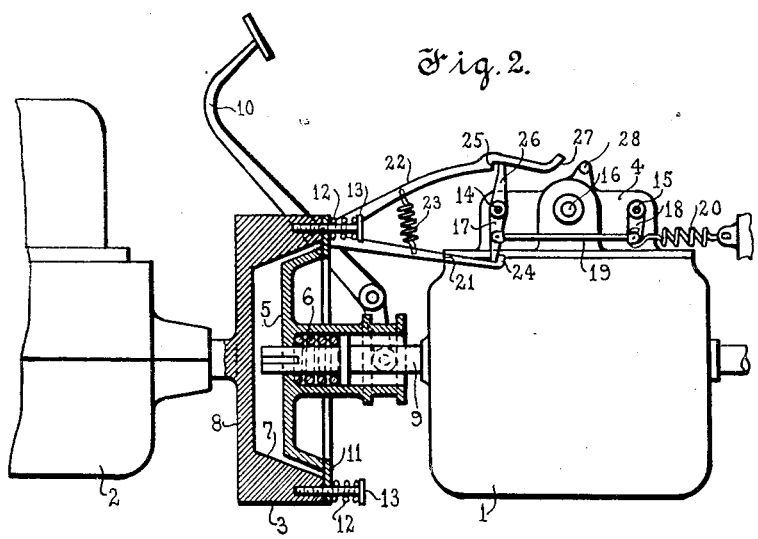

1,665,825

UNITED STATES PATENT OFFICE.

WILLIAM C. STEVENS, OF MILWAUKEE, WISCONSIN, ASSIGNOR, BY MESNE ASSIGNMENTS, TO VULCAN MOTOR DEVICES COMPANY, A CORPORATION OF PENNSYLVANIA.

POWER-TRANSMISSION SYSTEM.

Application filed March 12, 1923. Serial No. 624,355.

This invention relates to power transmission systems and while not limited thereto is particularly applicable to variable speed transmissions for automobiles and the like.

Automobiles usually include a variable speed gear set and a releasable friction clutch for transmitting power thereto and in effecting speed changes. It is the usual practice to merely disengage the clutch and then effect neutralizing and shifting operations prior to re-engagement thereof. However, it is difficult to shift the gears in this manner without considerable clashing due to the fact that the inertia of the driven element of the clutch and the parts connected thereto tends to prevent synchronization of the gears to be meshed.

The present invention has among its objects to provide a transmission system wherein provision is made for accelerating or braking the driven element of the clutch and the parts connected thereto by speed variations of the motor to facilitate meshing of the gears.

Another object is to provide a simple, rugged and compact clutch device having main and auxiliary friction parts the latter being adapted to act upon disengagement of the former to facilitate speed changes.

Another object is to provide a power transmission system including a clutch device of the aforesaid character and a selective speed gear shifting device operatively connected to the clutch and adapted to effect shifting and neutralizing operations in a proper time relation with respect to the clutch operations.

Various other objects and advantages of the invention will hereinafter appear.

The accompanying drawing illustrates an embodiment of the invention which will now be described, it being understood that the embodiment illustrated may be modified without departing from the scope of the appended claims.

In the drawing,

Fig. 1 is a schematic view of a power transmission system embodying the invention, the operating parts being shown in normal position; and Fig. 2 is a similar view illustrating the operating parts in another position.

Referring to Fig. 1 the same illustrates a conventional type of gear set 1 to be driven from a motor 2 through a clutch device 3, the gear set being of the sliding gear type and having associated therewith a gear shifting device 4 of the character disclosed in the patent application of Wm. C. Stevens and Herman J. Taylor, S. N. 589,886 filed September 20, 1922.

More specifically clutch device 3 includes a cone element 5, biased by a spring 6 to frictionally engage an internal cone friction surface 7 in a fly wheel 8 of motor 2. Cone element 5 is slidably mounted on the drive shaft 9 of gear set 1 but is fixed against rotation with respect thereto, and the same is controlled by a pivoted operating lever 10. Fly wheel 8 carries an annular friction plate 11 which is movable against the action of a plurality of springs 12 supported by pins 13 threaded into said fly wheel and upon disengagement of cone element 5 from friction surface 7 the right hand face of said element engages friction plate 11 to establish an auxiliary drive between gear set 1 and motor 2 for a purpose hereinafter set forth.

The gear shifting device 4, as set forth in the aforesaid patent application includes a pair of spaced cam elements adapted to engage selector parts therebetween to effect selected shifting and neutralizing operations. The operating shafts of the cam elements are indicated at 14 and 15 and the control member for the selector parts is indicated at 16. Operating shafts 14 and 15 have downwardly extending arms 17 and 18 fixed thereto respectively, said arms being connected by a link 19 and being normally held in the position shown in Fig. 1 by a spring 20. As set forth in the aforesaid patent application initial movement of the arms 17 and 18 out of normal position serves to effect selected neutralizing operations and continued movement thereof serves to effect selected shifting operations. In the transmission system illustrated it is desired to effect neutralizing operations during movement of element 5 towards the right and shifting operations during return movement thereof. For this purpose clutch lever 10 has a pair of levers 21 and 22 pivotally mounted thereon, said levers being biased towards each other by a spring 23 and the former being provided with a shoulder 24 for engaging lever 17 on the right hand side thereof and the latter being provided with a shoulder 25 for engaging the left hand side of an upwardly extending arm 26 fixed to shaft 14. The arrangement is such that upon depression of clutch lever 10, clutch element 5 is first disengaged from friction surface 7 and thereafter shoulder 24 engages arm 17 to move the same in a clockwise direction to the position shown in Fig. 2 to effect neutralizing operations. Immediately upon completion of neutralizing operations cone clutch element 5 engages friction plate 11 and the shoulder 25 of lever 22 moves into engagement with the left hand side of arm 26. The lever 22 will then serve to move arm 26 in a clockwise direction from the position shown in Fig. 2, during return movement of lever 10 to effect selected shifting operations. Shifting operations of the gears are started upon disengagement of cone element 5 from plate 11 and are completed prior to engagement of said element with cone surface 7. Immediately upon completion of the shifting operations an inclined surface 27 on lever 22 engages a fixed stop 28 to move the shoulder 25 of said lever upwardly out of engagement with arm 26. The gear shifting device then returns to normal position under action of spring 20.

From the foregoing it is apparent that if the speed of the engine is varied upon neutralization of the gears, friction plate 11 will act to produce variable driving or braking effects on cone clutch element 5 and the parts connected thereto. In shifting to reduced speed it is necessary to accelerate the cone element 5 and the parts connected thereto while in shifting to an increased speed it is necessary to decelerate said parts. Thus by proper speed variations of motor 2 upon neutralization of the gears, friction plate 11 will act upon cone clutch element 5 to synchronize the speed of the gears to be meshed to prevent clashing thereof during shifting operations.

While the transmission system illustrated includes an automatic gear shifting device it is apparent that the usual hand shift can be employed if desired. However, it is apparent that if a hand shift is employed it is exceedingly difficult to properly time the shifting and neutralizing operations with respect to the clutch operations. Further it is apparent that the auxiliary driving means can be incorporated in other types of clutches such as clutches of the multiple disc type or single plate type.

What I claim as new and desire to secure by Letters Patent is:

1. In a power transmission system, the combination with a motor and a variable speed gear set, of a clutch device therebetween including normally engaged main friction parts and normally released auxiliary friction parts, an operating member movable unidirectionally to effect disengagement of said former parts and engagement of the latter, and a selective speed gear shifting device associated with said gear set for effecting selected neutralizing operations upon release of said main friction parts and prior to engagement of said auxiliary friction parts, and for effecting selected gear shifting operations prior to reengagement of said main friction parts.

2. In a power transmission mechanism, the combination with a motor and a variable speed gear set, of a friction clutch normally connecting said motor to said gear set, auxiliary friction means associated with said clutch for reconnecting said gear set to said motor upon release of said clutch, and a selective speed gear shifting device associated with said gear set and with said clutch, said device being adapted to effect selected neutralizing operations upon release of said clutch and prior to reconnection of said gear set to said motor by said auxiliary means, and to effect selected shifting operations during reengagement of said clutch.

3. In a power transmission mechanism the combination with a motor and a variable speed gear set, of a clutch normally connecting said gear set to said motor and auxiliary friction means adapted upon release of said clutch to afford a driving connection between said motor and said gear set, said auxiliary means serving upon speed variations of said motor to effect coordination of the speed of the gears to be meshed.

4. In a power transmission system the combination with a motor and a selective speed gear set of a clutch therebetween having normally engaged driving and driven friction elements of a selective speed gear shifting device for said gear set, a common operating member for said clutch and said device movable in one direction to first release said clutch elements and to thereafter operate said device to effect selected neutralizing operations and movable in an opposite direction to first operate said device to effect shifting operations and to thereafter permit re-engagement of said clutch elements, and auxiliary driving means between said motor and said gear set adapted to be brought into action upon neutralization of the gears to permit co-ordination of the speed of the gears to be meshed by speed variations of said motor.

5. In a power transmission mechanism, the combination with a variable speed gear set and a driving motor therefor, of a selective speed shifting device having an operating member associated therewith, said device being adapted upon movement of said member in one direction to effect selected neutralizing operations and upon movement thereof in an opposite direction to effect selected shifting operations, and a clutch device between said gear set and said driving motor to be controlled by said operating part, said clutch device having main friction parts to be brought into engagement upon completion of gear shifting operations, and auxiliary friction parts to be brought into engagement upon completion of neutralizing operations.

6. In a power transmission mechanism, the combination with a gear set and a driving motor therefor, of a selective speed gear shifting device having an operating part associated therewith, said part being movable in one direction to effect selected neutralizing operations and in an opposite direction to effect selected shifting operations, and a cone clutch between said driving motor and said gear set having normally engaged main friction surfaces and normally released auxiliary friction surfaces, said clutch being controlled by said operating part.

7. In a variable speed transmission system in combination a gear set a clutch device for connecting said gear set to a driving motor said device including normally engaged driving and driven cone elements the latter being releasable from the former a friction plate mounted on said driving element and adapted to engage said driven element subsequent to release thereof and spring means associated with said friction member to permit the same to yield upon engagement of said driven element therewith.

In witness whereof, I have hereunto subscribed my name.

WILLIAM C. STEVENS.